United States Patent
Singh et al.

(10) Patent No.: US 10,606,728 B2
(45) Date of Patent: Mar. 31, 2020

(54) FRAMEWORK FOR DETECTING SOURCE CODE ANOMALIES

(71) Applicant: SAP SE, Walldorf (DE)

(72) Inventors: Rajinder Pal Singh, Gurgaon (IN); Jaspreet Singh, Gurgaon (IN); Vishu Agarwal, Gurgaon (IN)

(73) Assignee: SAP SE, Walldorf (DE)

( * ) Notice: Subject to any disclaimer, the term of this patent is extended or adjusted under 35 U.S.C. 154(b) by 260 days.

(21) Appl. No.: 15/257,884

(22) Filed: Sep. 6, 2016

(65) Prior Publication Data
US 2018/0067837 A1 Mar. 8, 2018

(51) Int. Cl.
| G06F 11/36 | (2006.01) |
|---|---|
| G06F 8/41 | (2018.01) |
| G06F 8/38 | (2018.01) |
| G06F 8/75 | (2018.01) |

(52) U.S. Cl.
CPC .......... *G06F 11/3608* (2013.01); *G06F 8/38* (2013.01); *G06F 8/434* (2013.01); *G06F 8/75* (2013.01); *G06F 11/3604* (2013.01); *G06F 11/3664* (2013.01); *G06F 11/3692* (2013.01)

(58) Field of Classification Search
CPC ........ G06F 11/3608; G06F 8/38; G06F 8/434; G06F 8/75; G06F 11/3664; G06F 11/3692
USPC ....................................................... 717/125
See application file for complete search history.

(56) References Cited

U.S. PATENT DOCUMENTS

| 2003/0041052 A1* | 2/2003 | Gajda ................. G06F 17/3041 |
|---|---|---|
| 2006/0036996 A1* | 2/2006 | Low .......................... G06F 8/20 717/113 |
| 2009/0100257 A1* | 4/2009 | Sandmel ............... G06T 15/005 713/100 |
| 2015/0339104 A1* | 11/2015 | Frenkiel ..................... G06F 8/20 717/113 |
| 2016/0246704 A1* | 8/2016 | Dhoolia .............. G06F 11/3664 |
| 2018/0032420 A1* | 2/2018 | Wadsworth ........... G06F 11/362 |

* cited by examiner

*Primary Examiner* — Emerson C Puente
*Assistant Examiner* — Sen Thong Chen
(74) *Attorney, Agent, or Firm* — Fish & Richardson P.C.

(57) ABSTRACT

Methods and system are disclosed that determine anomalies in the source code in a procedural program paradigm. In one aspect, an input to analyze source code may be received via an integrated development environment. Upon receiving the input, a source code analyzer model may be instantiated at a framework. Based on decision logic associated with the procedural programming paradigm, the source code may be analyzed by the instantiated source code analyzer model at the framework. In response to the analysis, anomalies associated with the source code may be determined at the framework. Upon determining the anomalies, a user interface model may be instantiated at the framework. The instantiated user interface model may provide a user interface that may display a list of solutions in response to the determined anomalies in the source code. An end user may select the solution that may be inserted into the source code.

20 Claims, 18 Drawing Sheets

SCE 402

PATTERN PRETTY PRINTER

REPORT    ZJS_TEST3    404    INACTIVE

```
 1   *& REPORT  ZJS_TEST3
 2   *&
 3   *&--------------------*
 4   *&
 5   *&
 6   *&
 7   *&--------------------*
 8
 9   REPORT  zjs_test3.
10
11   DATA: ls_ekko TYPE ekko.
12   SELECT * FROM spfli INTO TABLE it_spfli WHERE mandt = sy-mandt.
13
14   SELECT SINGLE s~carrid sf~seatsocc_f FROM spfli AS s
15                INNER JOIN sflight AS sf
16                ON s~carrid = sf~carrid
17                INTO it_spfli_sflight.
18
19   SELECT SINGLE ebeln FROM ekpo INTO lv_ekpo WHERE ebeln = '1212'.
20
21   APPEND ls_ekko TO it_ekko
```

| DESKTOP 1 | DESKTOP 2 | DESKTOP 3 | STANDARD | STRUCTURES | TABLES | OBJECTS | DETAIL DISPLAY |

```
55
56      lo_checklist           TYPE REF TO    cl_wb_checklist,
57      lo_checklist_state     TYPE REF TO        cl_wb_checklist_state,
58      lo_zauto_declare       TYPE REF TO        zauto_declare,
59      lv_decl_active         TYPE               xfeld.
60
61
62    IF sy-ucomm = 'WB_CHECK' or
63       sy-ucomm = 'OPT2'.
64
65    * check if user has activated the 'Auto Data Declaration' parameter
66      GET PARAMETER ID 'ZAUTO_DECL'FIELD lv_decl_active.
67    IF sy-subrc <> 0 or
68       lv_decl_active is INITIAL.
69      return.
70    ENDIF.
71
```

FIG. 4B

| DESKTOP 1 | DESKTOP 2 | DESKTOP 3 | STANDARD | STRUCTURES | TABLES | OBJECTS | DETAIL DISPLAY |

```
 1  METHOD analyse_statement.
 2    DATA: lv_operations_list  TYPE string,
 3          lv_offset            TYPE int4,
 4          lv_length            TYPE int4.
 5
 6    concatenate c_select c_loop c_read c_append c_modify c_delete c_move c_insert
 7    FIND REGEX lv_operations_list IN iv_statement MATCH OFFSET lv_offset MATCH
 8    IF sy-subrc = 0.
 9      rv_operation = iv_statement + lv_offset (lv_length).
10    ELSE.
11      FIND '=' IN iv_statement.
12      IF sy-subrc = 0.
13        rv_operation = c_equal.
14      ENDIF.
15    ENDIF.
16  ENDMETHOD.
```

502 (window)
504 (highlighted line)

FIG. 5A

```
508  [icons] STEP SIZE [STOP] [ ]WATCHPOINT [ ]LAYOUT [ ]CONFIGURE DEBUGGER LAYER DESKTOP 1 | DESKTOP 2 | DESKTOP 3 | STANDARD | STRUCTURES | TABLES | OBJECTS | DETAIL DISPLAY 44    The related data declaration
 45   □CASE lv_operation.
 46
 47      WHEN c_insert.
 48         rv_datatype = insert ( iv_variable = iv_variable iv_statement = lv_statement
 49      WHEN c_delete.
 50         rv_datatype = delete ( iv_variable = iv_variable iv_statement = lv_statement
 51      WHEN c_modify.
 52         rv_datatype = modify ( iv_variable = iv_variable iv_statement = lv_statement
 53      WHEN c_append.
 54         rv_datatype = append ( iv_variable = iv_variable iv_statement = lv_statement
 55      WHEN c_select.
 56         rv_datatype = select ( iv_variable = iv_variable iv_statement = lv_statement
 57      WHEN c_function.
 58         rv_datatype = function_module ( iv_variable = iv_variable iv_statement = lv_statement
 59      WHEN '='.
 60         rv_datatype = assignment ( iv_variable = iv_variable iv_statement = lv_statement
 61      WHEN c_loop.
 62         rv_datatype = loop ( iv_variable = iv_variable iv_statement = lv_statement
 63      WHEN c_read.
 64
```

```
*Table operation   TYPE = Cstring(52)
IF lv_cond_stmnt CS 'TABLE' OR lv_cond_stmnt CS 'APPENDINGTABLE'.
  lv_table_opr = abap_true.
  IF lv_cond_stmnt CS 'SINGLE'. " If single and into table are in same statement
    RETURN.
  ENDIF.
ENDIF.
```

FIG. 5C

```
77  * Select *. We will declare the variable directly as the type of DB table.
78  IF lv_cond_stmt CS ' * '.
79    lv_star = abap_true.
80    FIND REGEX ' *FROM\s+\b(\w+)\b' IN lv_statement SUBMATCHES lv_dbtable.
81    APPEND lv_dbtable TO lt_dbtable.
82  ELSE.
83    FIND REGEX ' (SELECT\SELECT SINGLE) \s+(.*) \s+(FROM\INTO)' IN lv_statement
84    IF sy-subrc = 0.
85      FIND REGEX ' *FROM\s+\b(\w+)\b.*' IN lv_statement SUBMATCHES lv_dbtable
86      APPEND lv_dbtable TO lt_dbtable.
87    ENDIF.
88    SPLIT lv_fields AT space INTO TABLE lt_fields.
89    READ TABLE lt_fields WITH KEY table_line = 'FROM' TRANSPORTING NO FIELD
90    IF sy-subrc = 0.
91      DELETE lt_fields FROM sy-tabix.
92    ENDIF.
93    READ TABLE lt_fields WITH KEY table_line = 'INTO' TRANSPORTING NO FIELD
94    IF sy-subrc = 0.
95      DELETE lt_fields FROM sy-tabix.
96    ENDIF.
97  ENDIF.
```

FIG. 5D

REPORT ZJS_TEST3

```
 1  *&---------------------
 2  *& REPORT  ZJS_TEST3
 3  *&
 4  *&---------------------
 5  *&
 6  *&
 7  *&---------------------
 8  REPORT  zjs_test3.
 9
10  DATA: ls_ekko TYPE ekko.
11  SELECT * FROM spfli INTO TABLE lt_spfli W
12
13  SELECT SINGLE s~carrid sf~seatsocc_f FRO
14                INNER JOIN s
15                ON s~carrid =
16                INTO lt_spfli_s
17
18  SELECT SINGLE ebeln FROM ekpo INTO lv
19
20  APPEND ls_ekko TO lt_ekko
21
```

PATTERN  PRETTY PRINTER

516 — TYPE DECLARATIONS / DATA DECLARATIONS — 514

| VARIABLE | TYPE | ASSOCIATED TYPE |
|---|---|---|
| LT_EKKO | TYPE TABLE OF | EKKO |
| LT_SPFLI | TYPE TABLE OF | SPFLI |
| LT_SPFLI_SFLIGHT | TYPE | T_SPFLI_SFLIGHT |
| LV_EKPO | TYPE | T_EKPO |

```
REPORT    ZJS_TEST3        INACTIVE (REVISED)  604    PATTERN  PRETTY PRINTER 8
 9        REPORT ZJS_TEST3.
10        *Data declarations added
11        TYPES: BEGIN OF t_ekpo,
12          ebeln TYPE ebeln,
13          END OF t_ekpo.                   ← Data declaration added  606
14
15
16        TYPES: BEGIN OF t_spfli_sflight,
17          carrid TYPE s_carr_id,
18          seatsocc_f TYPE s_socc_f,
19          END OF t_spfli_sflight.
20
21        DATA it_ekko TYPE TABLE OF ekko.
22        DATA it_spfli TYPE TABLE OF spfli.
23        DATA it_spfli_sflight TYPE t_spfli_sflight.
24        DATA iv_ekpo TYPE t_ekpo.
25

SCOPE:\BEGIN

⊗    /    ✗              ← Error message modified  608

SYNTAX ERROR
DESCRIPTION
PROGRAM ZJS_TEST3
LT_SPFLI DECLARED BY SMART EDITOR
PROGRAM ZJS_TEST3
LT_SPFLI_SFLIGHT DECLARED BY SMART EDITOR
PROGARM ZJS_TEST3
```

| DESKTOP 1 | DESKTOP 2 | ≡ ≡ ≡ ≡ STEP SIZE [STOP] ☐ WATCHPOINT ▦ LAYOUT 🖳 CONFIGURE DEBUGGER LAYER |
| --- | --- | --- |
| | | STANDARD / DESKTOP 3 / STRUCTURES / TABLES / OBJECTS / DETAIL DISPLAY |

```
 1  ☐ METHOD get_dtype_declared_var.
 2
 3        DATA:   lv_line           TYPE      int4,
 4                lv_statement      TYPE      string,
 5                lo_type           TYPE REF TO cl_abap_typedescr,
 6                lo_ttype          TYPE REF TO cl_abap_tabledescr,
 7                lo_line_type      TYPE REF TO cl_abap_datadescr,
 8                lv_ddic_type      TYPE      string,
 9                ls_declaration    TYPE      ty_declared_var,
10                ls_var_interface  TYPE      ty_declared_var,
11                lv_variable       TYPE      string,
12                lv_regex          TYPE      string,
13                lv_found          TYPE      abap_bool.
14
15        lv_variable = '\b' && iv_variable && '\b'.
16        CONDENSE lv_variable NO-GAPS.
17
18        READ TABLE gt_declared_var WITH KEY statement = iv_variable
19                                            index     = iv_index
20                                      TRANSPORTING NO FIELDS BIN
21        IF sy-subrc = 0.
22            lv_found = abap_true.
23        ELSE
```

FIG. 7B

```
*     Get type of the iv_variable
      FIND FIRST OCCURRENCE OF REGEX lv_variable IN TABLE gt_statement
      IF sy-subrc EQ 0.
        READ TABLE gt_statements_without_comma INTO lv_statement
        IF lv_statement IS NOT INITIAL.
          IF lv_statement CS 'BEGIN'.
            FIND REGEX 'BEGIN\s+OF\s+(\w+).*' IN lv_statement
            ev_kind = 'S'.
            ev_struc = lv_ddic_type.
*         Last word in lv_statement. The declaration type
          ELSEIF lv_statement CS 'TABLE'.
            FIND REGEX 'TABLE\s+OF\s+(\w+).*' IN lv_statement
            ev_kind = 's'.
            ev_struc = lv_ddic_type.
          ELSEIF lv_statement CS 'LINE'.
            FIND REGEX 'LINE\s+OF\s+(\w+).*' IN lv_statement
          TRY.
            CALL METHOD cl_abap_typedescr=>describe_by_name
              EXPORTING
                p_name      = lv_ddic_type
              RECEIVING
                p_descr_ref = lo_type
              EXCEPTIONS
```

FIG. 7C

FRAMEWORK FOR DETECTING SOURCE CODE ANOMALIES

BACKGROUND

Software applications and products may be developed using integrated development environments. Such integrated development environments may provide tools and mechanisms to ease the development of software applications. The integrated development environment may include contextual features such as detecting typographical errors. The complexity of the integrated development environment increases with the increase in features that may reduce the overall effort and time consumed for developing the software applications. In such a scenario, the complexity of the integrated development environments may be reduced by providing a framework that may be configurable based on context of programming paradigm. However, providing such a framework that may detect anomalies in source code based on the context of programming paradigm, may be challenging.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

FIG. 4A is a source code editor including source code in an integrated development environment, according to an embodiment.

FIG. 4B is a source code editor in an integrated development environment, according to an embodiment.

FIG. 5A is a user interface showing analysis of a statement in source code, according to an embodiment.

FIG. 5B shows a user interface showing analysis of a statement in source code, according to an embodiment.

FIG. 5C shows user interface showing analysis of a statement in source code, according to an embodiment.

FIG. 5D is user interface showing analysis of a statement in source code, according to an embodiment.

FIG. 5E is user interface showing a list of solutions in response to analysis of source code, according to an embodiment.

FIG. 6 is user interface showing inserting a solution for an anomaly in source code, according to an embodiment.

FIG. 7A is user interface showing analysis of a statement in source code, according to an embodiment.

FIG. 7B is user interface showing determining a type of variable, according to an embodiment.

FIG. 7C shows user interface showing determining declaration associated with a variable, according to an embodiment.

DETAILED DESCRIPTION

Figure 1:
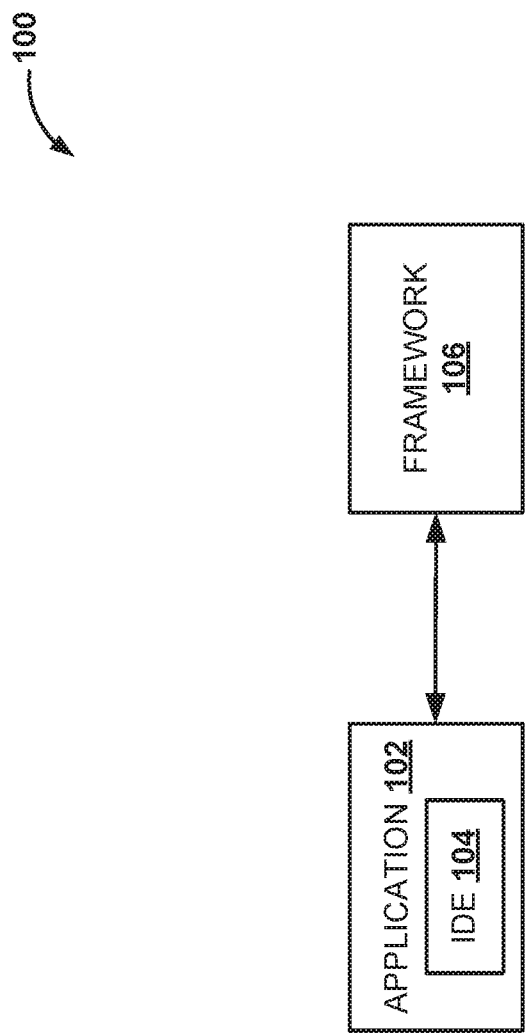
FIG. 1 is a block diagram illustrating environment to determine anomalies in source code, according to an embodiment.

Embodiments of techniques related to framework for detecting source code anomalies are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Customized software applications may be designed and built using programming paradigms. A programming paradigm may correspond to classifying programming languages based on style of programming. Some programming paradigms may be associated with execution models for executing a sequence of operations. For example, programming paradigms may include imperative programming, procedural programming, structured programming, object-oriented programming, declarative programming, functional programming, event-driven programming, etc.

In an embodiment, when software applications are developed using procedural programming, the operations or functions in the software applications may be executed through a procedure call. Such procedure calls may be routines, subroutines, programmable functions or methods, etc., which may include a sequence of instructions executed by processors. The routines, subroutines, etc. may be integrated or bundled as software packages, software components, etc., which may work in cooperation with each other in the software application. In an embodiment, a software component may correspond to set of instructions or program code that may be reused based on definition and implementation. The cooperation between the software components or software routines may provide a framework for designing software components with functionalities, instantiating function models, user interface engines, instantiating on demand functionalities, etc.

In an embodiment, an integrated development environment (IDE) may be used to develop software applications or products. The IDE may include an integration of components such as a source code editor, a source code debugger, automated tools and functions (e.g., framework for specific functions or operations) for code completion, framework for determining anomalies associated with source code, interpreter, compiler, etc. The IDE may provide mechanism for instantiating the automated tools and the framework for executing specific functions or operations. Depending on the configuration in the workflow, sequence of operations or tasks may be executed.

In an embodiment, the framework integrated with the IDE may also facilitate processing requests, accessing and retrieving data from the data store, etc. In an embodiment, the data may be stored in business objects residing the data store. A data store may correspond to an in-memory database, a web-based database, a conventional database, etc. The in-memory database may include a main memory and an underlying hardware for executing storage and computational operations. Typically, the data may be available in the main memory and operations such as, computations and memory-reads may be executed in the main memory.

FIG. 1 is a block diagram illustrating environment 100 to determine anomalies in source code, according to an embodiment. FIG. 1 shows an application 102 including integrated development environment (IDE) 104 that may work in cooperation with a framework 106. The framework 106 may provide a platform of integrated software routines, software components, data models, business models, engines, etc., that may be integrated to work in cooperation with each other to execute specific functions or operations. The software routines, software components, data models, business models, engines, etc., may be instantiated in sequence to execute such functions or operations.

In an embodiment, framework 106 may include routines, software components, etc., associated with a source code parsing model, a declaration engine, a source code insertion model, a user interface model, etc. (not shown). By cooperatively working with each other at framework 106, the above routines, software components, etc., may provide a mechanism for determining anomalies in source code. For example, the decision logic for determining the anomalies in the source code may depend on the programming paradigm. In an embodiment, framework 106 may work in conjunction with IDE 104 to provide operations like analyzing the source code, determining anomalies associated with the source code, determining data types associated with variables in the source code, determining declared or undeclared variables, etc.

In an embodiment, IDE 104 may include a tool bar with user interface elements (e.g., icons) that may be configured to receive user input. For example, an end user may click on the icons to instantiate framework 106 for executing specific operations (e.g., analyzing the source code, determining anomalies in the source code, etc.). In an embodiment, upon receiving an input to analyze the source code via IDE 104, framework 106 (e.g., source code analyzer model) may be instantiated. Based on decision logic associated with the procedural programming paradigm, the instantiated source code analyzer model may analyze the source code. For example, analyzing the source code may include parsing the source code, determining data types associated with the variables in the source code, determining declared variables in the source code, determining undeclared variables in the source code, etc. In response to the analysis, the anomalies associated with the source code may be determined. Upon determining the anomalies, the user interface model at the framework may be instantiated. The instantiation of the user interface model may provide a user interface that may display a list of solutions in response to the determined source code anomalies.

Figure 2:
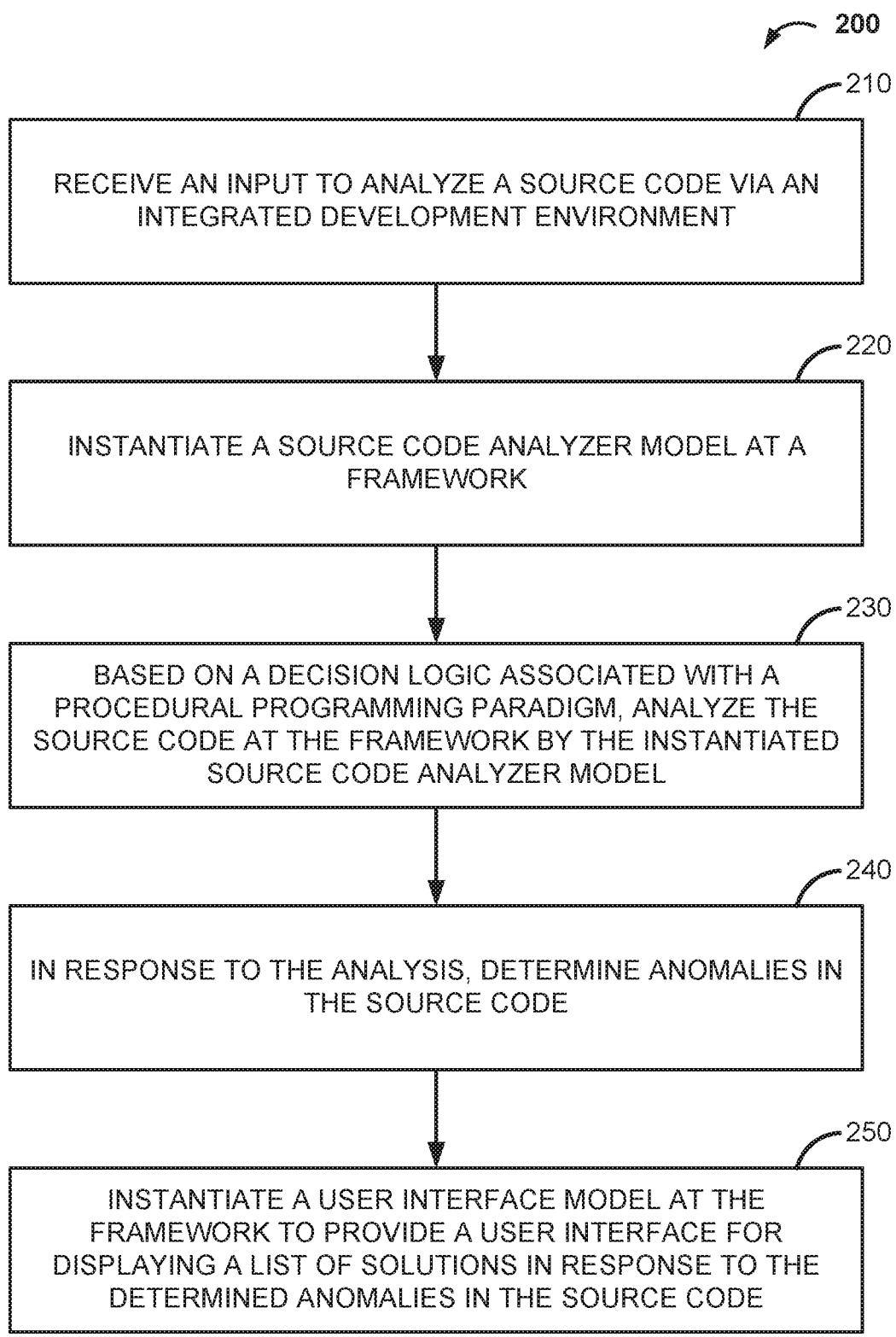
FIG. 2 is a flow diagram illustrating process to determine anomalies in source code in a procedural programming paradigm, according to an embodiment.

FIG. 2 is a flow diagram illustrating process 200 to determine anomalies in source code in a procedural programming paradigm, according to an embodiment. In an embodiment, anomalies in source code in a procedural programming paradigm may be determined. An application may include an integrated IDE that may work in cooperation with a framework to determine anomalies in the source code. For example, the source code may be associated with the procedural programming paradigm. Based on decision logic, rules etc., associated with the procedural programming paradigm, anomalies in the source code may be determined. In an embodiment, the framework may include an integration of software routines, software components, business models, data models, user interface models, source code analyzer model, etc., that may be instantiated based on an operation to be executed.

In an embodiment, to determine anomalies in the source code, the framework may be instantiated from the IDE. For example, the IDE may include a tool bar with user interface elements (e.g., icons) configured to instantiate and provide execution of specific operations and functionalities. When an end user clicks on an icon, the framework may be instantiated. Based on the functionality or operation, the framework may further instantiate software routines, data and/or business models, engines, etc., in a specific sequence. In an embodiment, such operations may include analyzing the source code to determine anomalies therein.

In an embodiment, an input to analyze source code via an integrated development environment is received, at 210. Upon receiving the input, a source code analyzer model at the framework is instantiated, at 220. In an embodiment, the framework may include routines, decision logic, rules, metadata information, etc., associated with procedural programming paradigm. Based on a decision logic associated with the procedural programming paradigm, the instantiated source code analyzer model analyzes the source code, at 230.

In an embodiment, upon instantiating the source code analyzer model, the framework may instantiate other models and engines in a sequence. For example, such instantiations may include instantiating a source code parsing model, a declaration engine, a source code insertion model, a user interface model, etc. In an embodiment, in response to the analysis, anomalies associated with the source code is determined, at 240. For example, such source code anomalies may be associated with entities (e.g., tags, conditional statements, variables, etc.) and data types. Data type may be used to determine a type of data associated with a variable or a declaration and may include integers, Boolean, real, etc. Based on the data type associated with the variables and type of operations that may be performed with the variables, type of values that may be assigned to the variables may be determined. Upon determining the anomalies, the framework instantiates a user interface model. The instantiated user interface model provides user interface to display a list of solutions in response to the determined anomalies in the source code, at 250. For example, the source code anomalies associated with the source code may include variables with missing or undeclared data types, undeclared variables, incomplete data types, incomplete function calls, etc.

Figure 3:
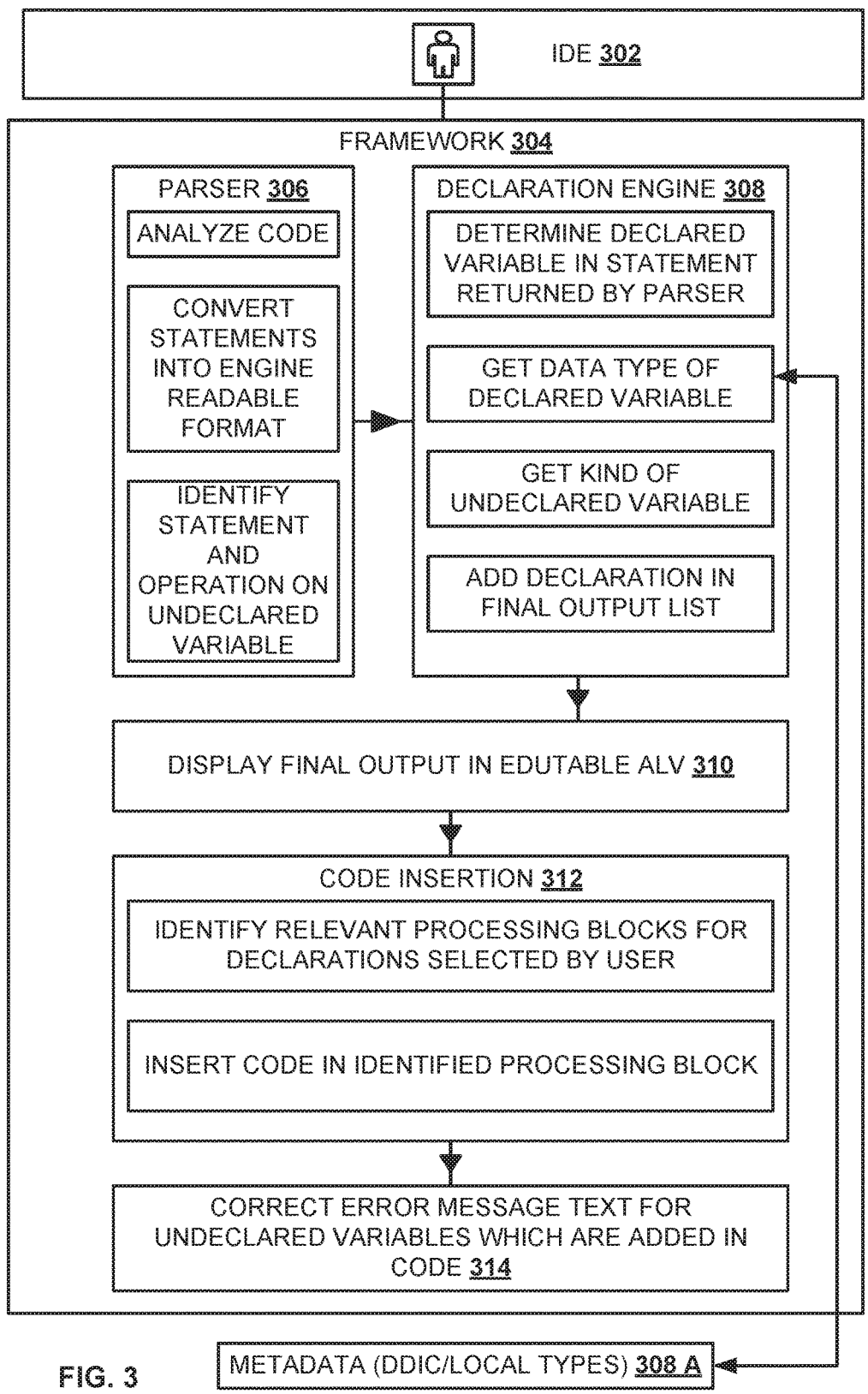
FIG. 3 is a block diagram showing framework for determining anomalies in source code, according to an embodiment.

FIG. 3 is a block diagram showing framework 304 for determining anomalies in source code, according to an embodiment. In an embodiment, an end user may instantiate framework 304 via IDE 302. Instantiating framework 304 may correspond to instantiating source code analyzer model. When framework 304 is instantiated, the source code parsing model (e.g., parser 306) may be instantiated. The instantiation of source code parsing model (e.g., parser 306) may execute operations (e.g., parsing, segregation, conversion, extraction, identify statement and operation, etc.) in a sequence. For example, instantiating the source code parsing model (e.g., parser 306) may execute operations like parsing the source code (e.g., analyze source code) to determine entities (e.g., source code elements, variables, etc.), data types associated with the variables in the source code, etc. The entities in the source code may be associated with the procedural programming paradigm and may include declared variables, undeclared variables, keywords, operations (e.g., mathematical, Boolean, logical, etc.). Upon parsing the source code, the declared variables, the undeclared variables, the keywords, the operations, etc., may be segregated into groups. Upon segregation, groups of the declared variables, the undeclared variables, the keywords, the operations, etc., may be converted into structured statements (e.g., declaration engine readable format). The source code parsing model (e.g., parser 306) may identify statement and operation on undeclared variables. In an embodiment, the undeclared variables may be extracted into a list of anomalies associated with the source code.

In an embodiment, subsequently declaration engine 308 at framework 304 may be instantiated. The instantiation of declaration engine 308 may execute the operation of determining data type associated with the declared variables. To determine the data types associated with the declared variables, the declaration engine may establish a connection with a data dictionary (e.g., metadata DDIC/Local types 308 A). In an embodiment, data dictionary (e.g., 308 A) may include metadata information associated with the declared variables. The declaration engine 308 may determine the data type associated with the undeclared variables based on decision logic associated with the procedural programming paradigm. For example, the decision logic for determining an undeclared variable may be based on determining 'KIND' of variable. The 'KIND' of variable may be assigned values, for example, 'TYPE' or 'TYPE TABLE OF'. When the undeclared variable 'KIND' is determined as 'TYPE TABLE OF', the decision logic may determine that the undeclared variable type may be 'internal table' associated with a data element or a data structure.

In an embodiment, the decision logic associated with the procedural programming may reference Table 1 below to determine the undeclared variable based on 'KIND' value.

TABLE 1

| KIND | VARIABLE TYPE | DATA TYPE |
|---|---|---|
| Type Table Of | Data Element/ Data Structure | Table |
| Type | Table Type | Table |
| Type | Data Element/ Data Structure | Work Area |
| Type | Data Element | Variable |

In an embodiment, instantiating the source code analyzer model may instantiate the user interface model. The instantiation of the user interface model may provide a user interface (e.g., pop up window or user interface or display final output in edutable alv 310 (Advanced Business Application Programming (ABAP) list viewer) to display data type or variable type associated with the undeclared variables. The user interface may also display a list of solutions for the determined source code anomalies. The undeclared variable may also be added to the displayed list of solutions in response to the determined source code anomalies (e.g., 310).

In an embodiment, source code insertion model (e.g., code insertion 312) may be instantiated at framework 304. The instantiation of the source code insertion model (e.g., 312) may determine or identify blocks of code segments in which the undeclared variables may be added or included. Such identified blocks of code segments in the source code may be highlighted. In an embodiment, the user interface displaying the list of solutions (e.g., display final output in editable ALV 310) in response to the determined anomalies in the source code may receive a selection from an end user. For example, the end user may determine which undeclared variable may be selected and added to a particular block of code segment.

For example, the source code insertion model (e.g., 312) may highlight the block of code segment where declaration for a variable (e.g., undeclared variable) is missing. The source code insertion model may use decision logic to determine whether the declaration for the undeclared variable needs to be inserted within certain block of code or globally in the source code and accordingly highlights the blocks of code segments (e.g., identify relevant processing blocks for declarations selected by user). Based on the nature of the variable, the end user may choose to insert the undeclared variable either globally or within a certain block of code segment. The selected undeclared variable including the data type may be inserted in the block of code segment (e.g., code in identified processing block). In an embodiment, upon inserting the undeclared in the block of code segment, the pop up window displaying the list of solutions may be dynamically updated. For example, upon inserting the undeclared variable globally or in a specific block of code segment, the inserted undeclared variable may be removed from the displayed list of solutions (e.g., correct error message text for undeclared variables which are added in code 314).

FIG. 4A is a source code editor including source code in an integrated development environment, according to an embodiment. FIG. 4A exemplarily shows the source code editor (SCE) 402 including source code elements 406 (e.g., variables, data types, select statements, etc.) The source code editor 402 may include a tool bar 404 including user interface elements indicated by buttons and graphical icons in FIG. 4A (e.g., buttons, graphical icons, etc.) that may be associated with specific functionalities. In an embodiment, framework for determining anomalies in the source code may be instantiated from the IDE.

FIG. 4B is a source code editor 408 in an integrated development environment, according to an embodiment. In an embodiment, the source code analyzer model (e.g., framework) may be instantiated via the source code editor 408 in the IDE. The source code editor 408 shows a tool bar 410 including user interface elements (e.g., graphical elements, buttons, graphical icons, etc.) associated with specific functionalities. In an embodiment, the framework (e.g., source code analyzer model) to determine anomalies in the source code may be instantiated via the IDE. Upon instantiation, the source code analyzer model may analyze the code may provide enhancements to the source code. For example, as shown in FIG. 4B, line 66 of the source code (e.g., indicated by arrow) shows GET PARAMETER ID 'ZAUTO_DECL'. Such source code enhancement may indicate that the variable 'ZAUTO_DECL' may be an undeclared variable type.

Figure 4C:
FIG. 4C is a user interface showing configuration information associated with framework for detecting source code anomalies, according to an embodiment.

FIG. 4C is a user interface 412 showing configuration information associated with framework for detecting source code anomalies, according to an embodiment. In an embodiment, upon instantiating the source code analyzer model via the IDE, the source code analyzer model may analyze the source code. Upon completing the analysis of the source code, the user interface model may be instantiated that may provide a user interface showing the source code anomalies. FIG. 4C shows list of user login details 414, declared variables, undeclared variables, corresponding values, etc. FIG. 4C shows configuration information using which an end user may instantiate the framework for detecting source code anomalies. For example, such configuration information may include automatic data declaration (e.g., ZAUTO_DECL) 416, description including 'PARAMETER ID', 'PARAMETER VALUE', 'Short Description', etc.

FIG. 5A is a user interface 502 showing analysis of a statement in source code, according to an embodiment. In an embodiment, source code 504 may be analyzed by instantiating the source code analyzer model. FIG. 5A shows a mechanism (e.g., a method) for analyzing a statement in source code 504. For example, the source including the following statement may be analyzed:

```
SELECT * FROM SPFLI INTO TABLE LT_SPFLI WHERE MANDT = 'SY_MANDT'
```

In an embodiment, analyzing the source code may include segregating declared variables, undeclared variables, identifying data type associated with the variables, etc. In an embodiment, analyzing the source code may also include determining the operation executed by the statement in the source code, looping on the statements in the source code, determining the statements in the source code that include undeclared variables, determining data types of declared variables, etc.

FIG. 5B shows a user interface 506 showing analysis of a statement in source code, according to an embodiment. FIG. 5B shows user interface 506 showing an analysis of a statement in the source code. The user interface shows a tool bar 508 including graphical elements like graphical icons, buttons, etc., configured to execute specific functions and operations. User interface 506, at line '55' indicated by an arrow, shows analysis of a 'SELECT' statement. In response to the analysis, the source code analyzer model may determine that the statement being analyzed includes 'SELECT' operation and may instantiate or call the process or method associated with 'SELECT' operation to execute the 'SELECT' operation.

FIG. 5C shows user interface 510 showing analysis of a statement in source code, according to an embodiment. FIG. 5C shows user interface 510 in which an operation associated with the statement under analysis may be determined. As discussed previously, 'KIND' value associated with an undeclared variable may be used to determine variable type and/or data type. In an embodiment, the source code analysis model may determine whether the operation associated with the statement being analyzed is an operation on a table or a variable. In FIG. 5C, at line '52' indicated by arrow shows that it may be determined that the statement being analyzed includes an operation on a table.

FIG. 5D is user interface 512 showing analysis of a statement in source code, according to an embodiment. In an embodiment, the source code analyzer model may analyze the source code and determine all aliases (e.g., variables, table names, etc.) in the source code. The source code analyzer model may include a mechanism to remove the aliases from the source code. When the source code statement includes a 'SELECT' statement, the source code analyzer may determine fields (e.g., table, data fields, etc.) to be selected. For example, when the source code statement includes a 'SELECT*' operation, then the 'TYPE' declaration may be done using database type or local type for all the selected fields. In an embodiment, when source code including statement 'SELECT*' may be determined as 'TABLE' (e.g., data type as table), the undeclared variable may be determined as 'TYPE TABLE OF' from Table 1, as discussed previously. Upon determining, the declaration may be displayed on a user interface instantiated by the user interface model in the framework.

FIG. 5E is user interface 514 showing a list of solutions in response to analysis of source code, according to an embodiment. In an embodiment, upon analyzing the source code, the source code analyzer model may generate a list of solutions in response to the analysis of the source code. As discussed previously, the source code analyzer model may analyze the source code, determine the anomalies associated with the source code and generate a list of solutions in response to the determined anomalies. In an embodiment, the framework may instantiate user interface model, which may provide user interfaces (e.g., 514, 516) that may render the anomalies in the source code. FIG. 5E shows user interface 516 including tabs, for example, 'DATA DECLARATION', 'TYPE DECLARATIONS', etc. The tab 'DATA DECLARATION' displays solutions associated with data declaration including parameters, such as 'Variables', 'Type', 'Associated Type', etc., in response to the analysis of the source code by the source code analyzer model.

Figure 5F:
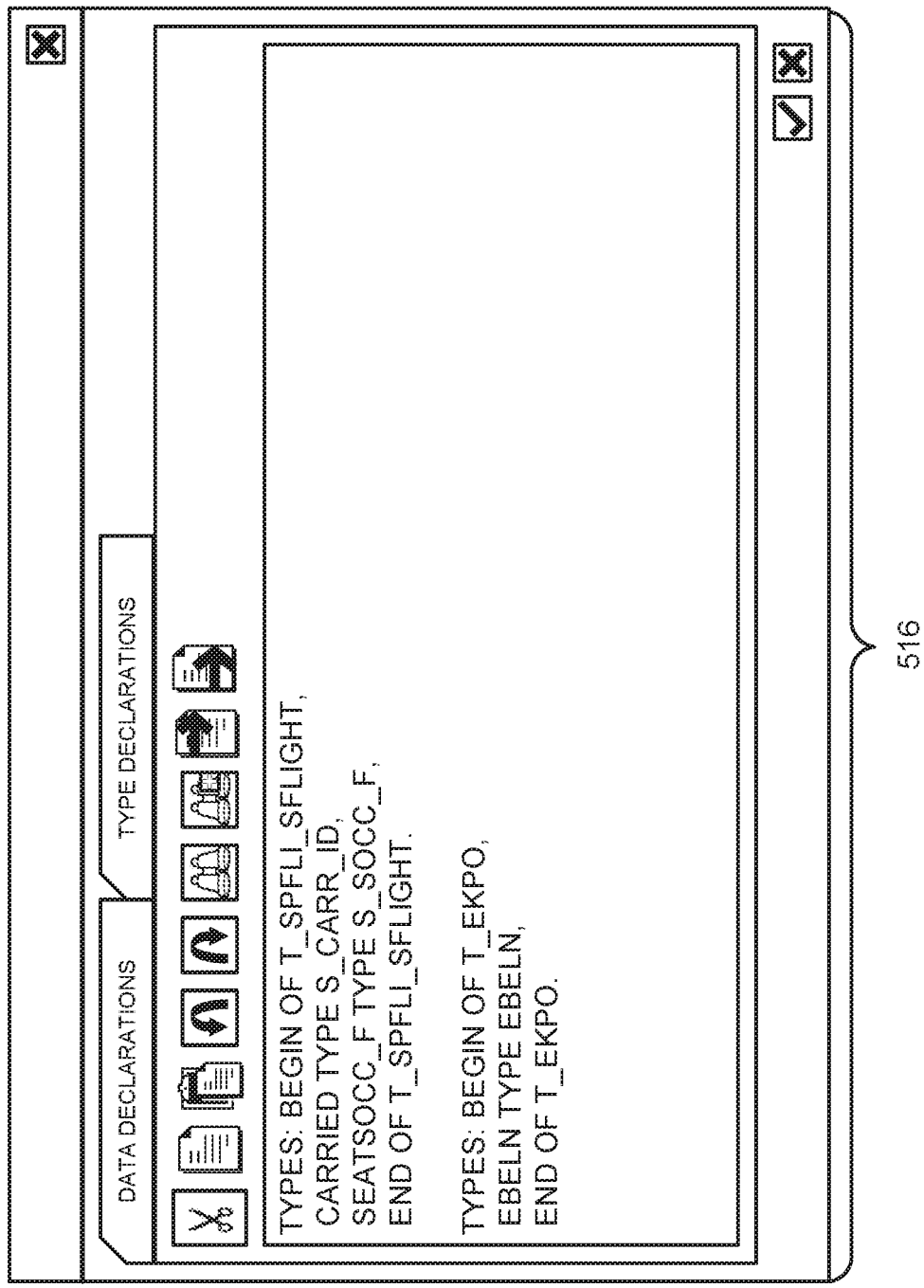
FIG. 5F is user interface showing a list of solutions in response to analysis of source code, according to an embodiment.

FIG. 5F is user interface 516 showing a list of solutions in response to analysis of source code, according to an embodiment. As discussed previously, the user interface model in the framework may instantiate user interface to display a list of solutions in response to analysis of the source code. FIG. 5F shows user interface 516 displaying solutions associated with type declarations in response to the analysis of the source code by the source code analyzer in the framework.

FIG. 6 is user interface 602 showing inserting a solution for an anomaly in source code, according to an embodiment. In an embodiment, a source code insertion model (e.g., code insertion 312 of FIG. 3) may be instantiated to insert a solution from the list of solutions displayed on the user interface as shown in FIGS. 5E and 5F. In an embodiment, an end user may select the solution (e.g., undeclared variable, data type for a variable, etc.) which may be inserted in the source code. FIG. 6 shows user interface 602 includes a tool bar 604 with graphical elements (e.g., graphical icons, buttons, etc.) associated with specific functionalities and operations. In FIG. 6, 606 (e.g., Data declaration added) shows insertion of data declaration in the source code upon instantiating source code insertion model. Upon inserting the data declaration, the user interface displaying the list of solutions in response to the anomalies may be dynamically updated (e.g., Error Message Modified 608). For example, upon insertion, the corresponding data declaration may be removed from the displayed list of solutions.

Figure 7A:
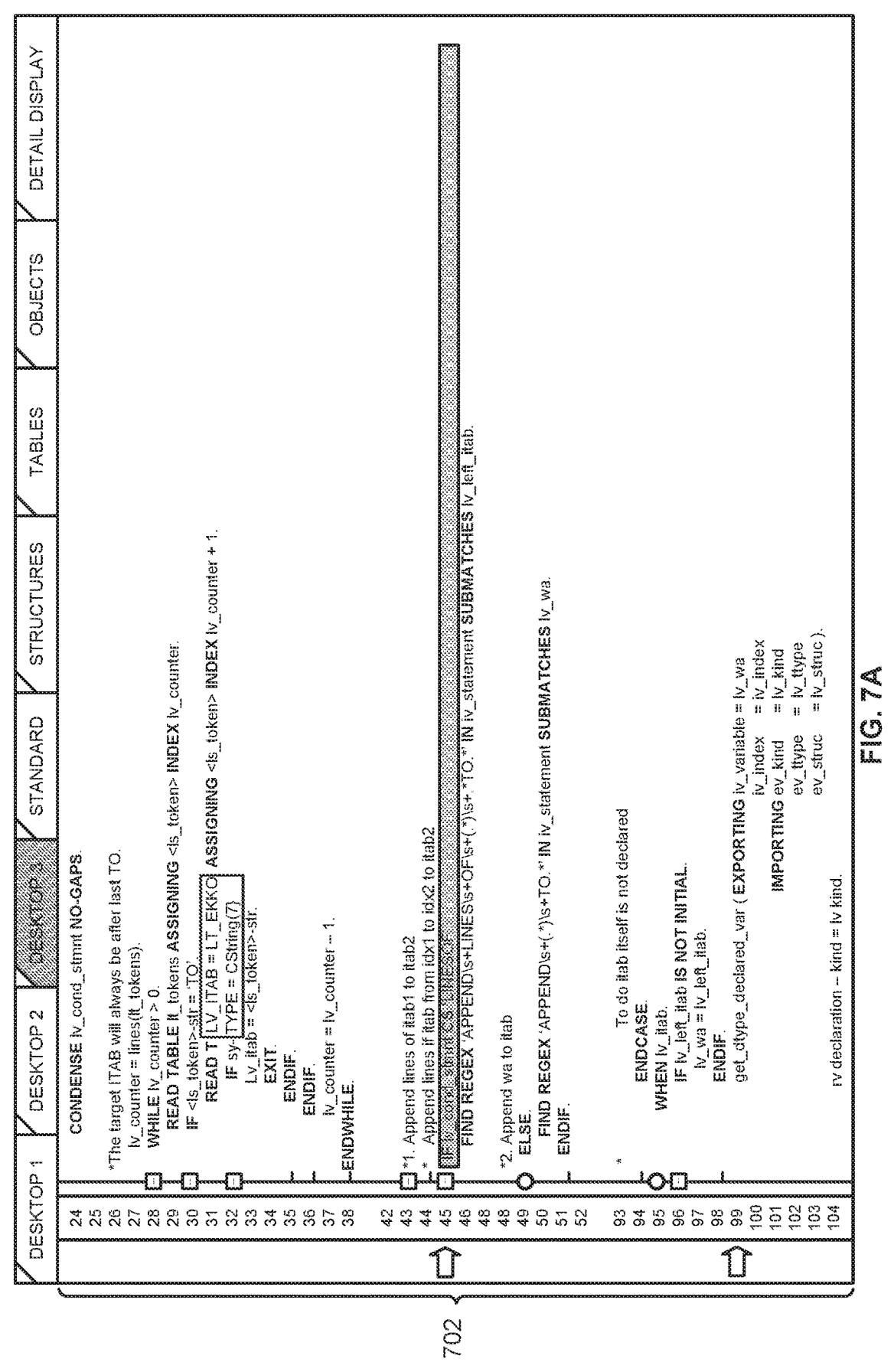

FIG. 7A is user interface 702 showing analysis of a statement in source code, according to an embodiment. In an embodiment, analyzing the source code may include analyzing a statement, which may include converting the statement into tokens (e.g., internal table tokens). Further analysis of the statement may include determining or identifying the target internal table in the statement. FIG. 7A shows analysis of statement on line 45 (e.g., indicated by arrow) in the source code. Further, source internal table or work area may be identified using regular expressions. As explained previously, an undeclared variable associated with source internal table or target internal table may be identified. FIG. 7A shows user interface 702 in which the undeclared variable is identified to be associated with target internal table. In an embodiment, the declaration associated with the source internal table (e.g., source itab) may be determined or identified by instantiating the associated process or method (e.g., get_dtype_declared_var( )). In an embodiment, the declaration of source variable may be determined from the declared variable list.

FIG. 7B is user interface 704 showing determining a type of variable, according to an embodiment. As explained previously, declaration for type of variable may be determined by the framework using Table 1. User interface 704 of FIG. 7B shows 'DATA', 'TYPE', conditional statements, etc., in the source code.

FIG. 7C shows user interface 706 showing determining declaration associated with a variable, according to an embodiment. In an embodiment, user interface 706 of FIG. 7C shows determining declaration associated with a variable in the source code. As explained previously, the framework (e.g., source code analyzer) may be used to determine the declaration associated with the variable. For example, line 32 in FIG. 7C shows occurrence of REGEX lv_variable in Table gt_statement.

Figure 8:
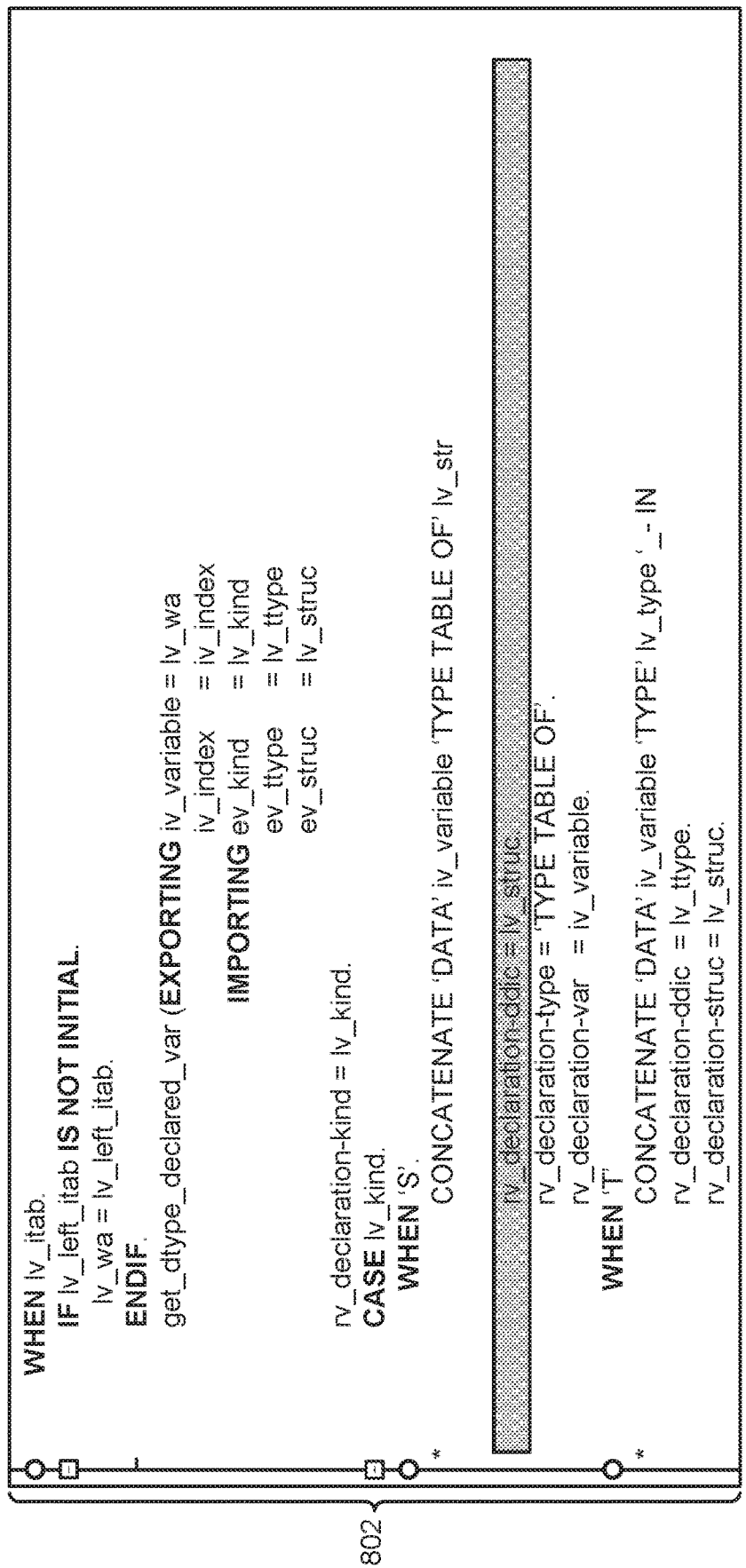
FIG. 8 is user interface showing declaration of source variable, according to an embodiment.

FIG. 8 is user interface 802 showing declaration of source variable, according to an embodiment. In an embodiment, user interface 802 shows declaration of source variable that may be inserted into a variable (e.g., source variable). User interface in FIG. 8 shows that the determined type of variable may be inserted into source variable.

Some embodiments may include the above-described methods being written as one or more software components. These components, and the functionality associated with each, may be used by client, server, distributed, or peer computer systems. These components may be written in a computer language corresponding to one or more programming languages such as functional, declarative, procedural, object-oriented, lower level languages and the like. They may be linked to other components via various application programming interfaces and then compiled into one complete application for a server or a client. Alternatively, the components may be implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a tangible computer readable storage medium. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 9:
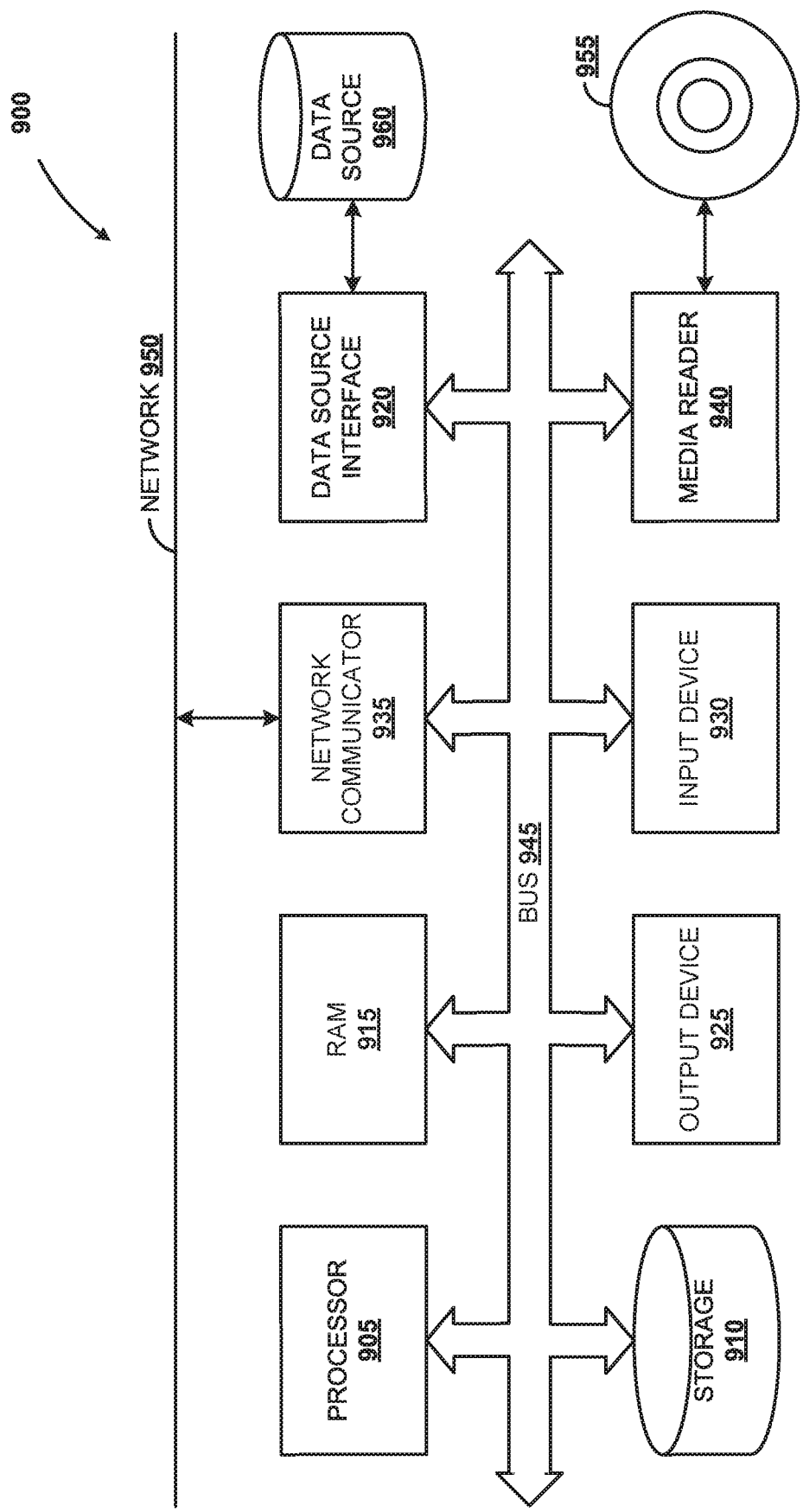
FIG. 9 is a block diagram of an exemplary computer system, according to an embodiment.

FIG. 9 is a block diagram of an exemplary computer system 900, according to an embodiment. Computer system 900 includes processor 905 that executes software instructions or code stored on computer readable storage medium 955 to perform the above-illustrated methods. For example, software instructions or code stored on computer readable storage medium 955 may correspond to the optimization algorithms, estimation algorithms, generate an optimum execution schedule, calculating processor idle times during the transformation of business data, determining whether to rearrange the transformation of business data in the tables between the processors, etc. Processor 905 can include a plurality of cores. Computer system 900 includes media reader 940 to read the instructions from computer readable storage medium 955 and store the instructions in storage 910 or in random access memory (RAM) 915. Storage 910 provides a large space for keeping static data where at least some instructions could be stored for later execution. According to some embodiments, such as some in-memory computing system embodiments, RAM 915 can have sufficient storage capacity to store much of the data required for processing in RAM 915 instead of in storage 910. In some embodiments, all of the data required for processing may be stored in RAM 915. The stored instructions may be further compiled to generate other representations of the instructions and dynamically stored in RAM 915. Processor 905 reads instructions from RAM 915 and performs actions as instructed. According to one embodiment, computer system 900 further includes output device 925 (e.g., a display) to provide at least some of the results of the execution as output including, but not limited to, visual information to users and input device 930 to provide a user or another device with means for entering data and/or otherwise interact with computer system 900. Each of these output devices 925 and input devices 930 could be joined by one or more additional peripherals to further expand the capabilities of computer system 900. Network communicator 935 may be provided to connect computer system 900 to network 950 and in turn to other devices connected to network 950 including other clients, servers, data stores, and interfaces, for instance. The modules of computer system 900 are interconnected via bus 945. Computer system 900 includes a data source interface 920 to access data source 960. Data source 960 can be accessed via one or more abstraction layers implemented in hardware or software. For example, data source 960 may be accessed by network 950. In some embodiments data source 960 may be accessed via an abstraction layer, such as a semantic layer.

A data source is an information resource. Data sources include sources of data that enable data storage and retrieval.

Data sources may include databases, such as relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A computing system to determine anomalies in a source code in a procedural programming paradigm, comprising:
a memory storing computer instructions; and
a processor communicatively coupled with the memory to execute the instructions to perform operations comprising:
receiving, from a user, an input to analyze a source code via an integrated development environment;
in response to receiving the input to analyze the source code, instantiating a source code analyzer model at a framework, wherein the framework includes decision logic, routines, rules, and metadata information associated with a procedural programming paradigm;
based on the decision logic associated with the procedural programming paradigm, analyzing the source code at the framework by the instantiated source code analyzer model to determine entities associated with the procedural programming paradigm, wherein the entities comprise declared variables and undeclared variables, keywords, and operations;
based on converting groups of the declared variable, the undeclared variables, the keyword, and the operations into structured statements, identifying first set of structured statements associated with the undeclared variables;
in response to the analysis of the source code and the identified first set of structured statements, determining a plurality of anomalies in the source code, the plurality of anomalies including the undeclared variables;
determining data types associated with the undeclared variables based on the decision logic associated with the procedural programming paradigm and on an analysis of the first set of structured statements;
determining a position within the source code to insert a declaration of a first undeclared variable from the undeclared variables; and
upon determining the plurality of anomalies, instantiating a user interface model at the framework for providing a user interface to display a list of solutions in response to the determined plurality of anomalies in the source code, wherein the list of solutions includes the declaration of the first undeclared variable, wherein the declaration includes a determined data type for the first undeclared variable from the determined data types, and wherein the declaration is to be inserted at the determined position.

2. The computing system of claim 1, wherein:
upon instantiating the source code analyzer model, the framework further instantiates a source code parsing model, a declaration engine, a source code insertion model and a user interface model.

3. The computing system of claim 2, wherein instantiating the source code parsing model, comprises:
parsing the source code to determine the entities associated with the procedural programming paradigm and data types of the determined declared variables and the determined undeclared variables;
segregating the declared variables, the undeclared variables, the keywords, and the operations;
converting the keywords, the operations, the declared variables and the undeclared variables into the structured statements; and
from the structured statements, extracting the undeclared variables to be added into the plurality of anomalies associated with the source code.

4. The computing system of claim 2, wherein instantiating the declaration engine, comprises:
determining data types associated with the declared variables by retrieving metadata information associated with the declared variables from a data dictionary stored in the metadata information of the framework.

5. The computing system of claim 2, wherein instantiating the source code insertion model, comprises:
identifying one or more blocks of code in the source code including the undeclared variables;
based on the identification, highlighting the identified one or more blocks of code in the source code including the one or more undeclared variables;
receiving a selection of at least one undeclared variable from the list of solutions; and
inserting the selected at least one undeclared variable in the identified one or more blocks of code in the source code.

6. The computer system of claim 5, further comprising:
upon inserting the at least one undeclared variable, dynamically updating the displayed list including the plurality of source code anomalies.

7. The computer system of claim 1, wherein the position to insert the declaration of the first undeclared variable with the determined data type is selected from positions within existing blocks of code included in the source code and a global position outside of an existing block of code to declare the undeclared variable on a global source code level, wherein the position of the block of code is associated with a scope of relevance of the undeclared variable for the analyzed source code.

8. The computer system of claim 1, wherein the data type of the first undeclared variables is determined based on the decision logic referencing to kind values assigned for the first undeclared variable, wherein based on evaluation of the kind values, a variable type of the undeclared variable is determined.

9. A computer implemented method to determine anomalies in a source code in a procedural programming paradigm, comprising:
receiving, from a user, an input to analyze a source code via an integrated development environment;
in response to receiving the input to analyze the source code, instantiating, by a processor of a computer, a source code analyzer model at a framework, wherein the framework includes decision logic, routines, rules, and metadata information associated with a procedural programming paradigm;
based on the decision logic associated with the procedural programming paradigm, analyzing the source code at the framework by the instantiated source code analyzer model to determine entities associated with the procedural programming paradigm, wherein the entities comprise declared variables and undeclared variables, keywords, and operations;
based on converting groups of the declared variable, the undeclared variables, the keyword, and the operations into structured statements, identifying first set of structured statements associated with the undeclared variables;
in response to the analysis of the source code and the identified first set of structured statements, determining a plurality of anomalies in the source code, the plurality of anomalies including the undeclared variables;
determining data types associated with the undeclared variables based on the decision logic associated with the procedural programming paradigm and on an analysis of the first set of structured statements;
determining a position within the source code to insert a declaration of a first undeclared variable from the undeclared variables; and
upon determining the plurality of anomalies, instantiating a user interface model at the framework for providing a user interface to display a list of solutions in response to the determined plurality of anomalies in the source code, wherein the list of solutions includes the declaration of the first undeclared variable, wherein the declaration includes a determined data type for the first undeclared variable from the determined data types, and wherein the declaration is to be inserted at the determined position.

10. The computer implemented method of claim 9, wherein:
upon instantiating the source code analyzer model, the framework further instantiates, by the processor of the computer, a source code parsing model, a declaration engine, a source code insertion model and a user interface model.

11. The computer implemented method of claim 10, wherein instantiating, by the processor of the computer, the source code parsing model, comprises:
parsing the source code to determine the entities associated with the procedural programming paradigm and data types of the determined declared variables and the determined undeclared variables;
segregating the declared variables, the undeclared variables, the keywords, and the operations;
converting the keywords, the operations, the declared variables and the undeclared variables into the structured statements; and
from the structured statements, extracting the undeclared variables to be added into the plurality of anomalies associated with the source code.

12. The computer implemented method of claim 10, wherein instantiating, by the processor of the computer, the declaration engine, comprises:
determining data types associated with the declared variables by retrieving metadata information associated with the declared variables from a data dictionary stored in the metadata information of the framework.

13. The computer implemented method of claim 10, wherein instantiating, by the processor of the computer, the source code insertion model, comprises:
identifying one or more blocks of code in the source code including the undeclared variables;
based on the identification, highlighting the identified one or more blocks of code in the source code including the one or more undeclared variables;
receiving a selection of at least one undeclared variable from the list of solutions; and
inserting the selected at least one undeclared variable in the identified one or more blocks of code in the source code.

14. The computer implemented method of claim 13, further comprising: upon inserting the at least one undeclared variable, dynamically updating, by the processor of the computer, the displayed list including the plurality of source code anomalies.

15. A non-transitory computer readable storage medium tangibly storing instructions, which when executed by a computer, cause the computer to execute operations, comprising:
receiving, from a user, an input to analyze a source code via an integrated development environment;
in response to receiving the input to analyze the source code, instantiating a source code analyzer model at a framework, wherein the framework includes decision logic, routines, rules, and metadata information associated with a procedural programming paradigm;
based on the decision logic associated with the procedural programming paradigm, analyzing the source code at the framework by the instantiated source code analyzer model to determine entities associated with the procedural programming paradigm, wherein the entities comprise declared variables and undeclared variables, keywords, and operations;
based on converting groups of the declared variable, the undeclared variables, the keyword, and the operations into structured statements, identifying first set of structured statements associated with the undeclared variables;

in response to the analysis of the source code and the identified first set of structured statements, determining a plurality of anomalies in the source code, the plurality of anomalies including the undeclared variables;

determining data types associated with the undeclared variables based on the decision logic associated with the procedural programming paradigm and on an analysis of the first set of structured statements;

determining a position within the source code to insert a declaration of a first undeclared variable from the undeclared variables; and upon determining the plurality of anomalies, instantiating a user interface model at the framework for providing a user interface to display a list of solutions in response to the determined plurality of anomalies in the source code, wherein the list of solutions includes the declaration of the first undeclared variable, wherein the declaration includes a determined data type for the first undeclared variable from the determined data types, and wherein the declaration is to be inserted at the determined position.

16. The non-transitory computer readable storage medium of claim 15, wherein: upon instantiating the source code analyzer model, the framework further instantiates a source code parsing model, a declaration engine, a source code insertion model and a user interface model.

17. The non-transitory computer readable storage medium of claim 16, wherein instantiating the source code parsing model, comprises:

parsing the source code to determine the entities associated with the procedural programming paradigm and data types of the determined declared variables and the determined undeclared variables;

segregating the declared variables, the undeclared variables, the keywords, and the operations;

converting the keywords, the operations, the declared variables and the undeclared variables into the structured statements; and from the structured statements, extracting the undeclared variables to be added into the plurality of anomalies associated with the source code.

18. The non-transitory computer readable storage medium of claim 16, wherein instantiating the declaration engine, comprises:

determining data types associated with the declared variables by retrieving metadata information associated with the declared variables from a data dictionary stored in the metadata information of the framework.

19. The non-transitory computer readable storage medium of claim 16, wherein instantiating the source code insertion model, comprises:

identifying one or more blocks of code in the source code including the undeclared variables;

based on the identification, highlighting the identified one or more blocks of code in the source code including the one or more undeclared variables;

receiving a selection of at least one undeclared variable from the list of solutions; and inserting the selected at least one undeclared variable in the identified one or more blocks of code in the source code.

20. The non-transitory computer readable storage medium of claim 19, further comprising: upon inserting the at least one undeclared variable, dynamically updating the displayed list including the plurality of source code anomalies.

* * * * *